April 8, 1941.  B. F. WADDELL  2,237,399
REGULATOR
Original Filed June 23, 1938
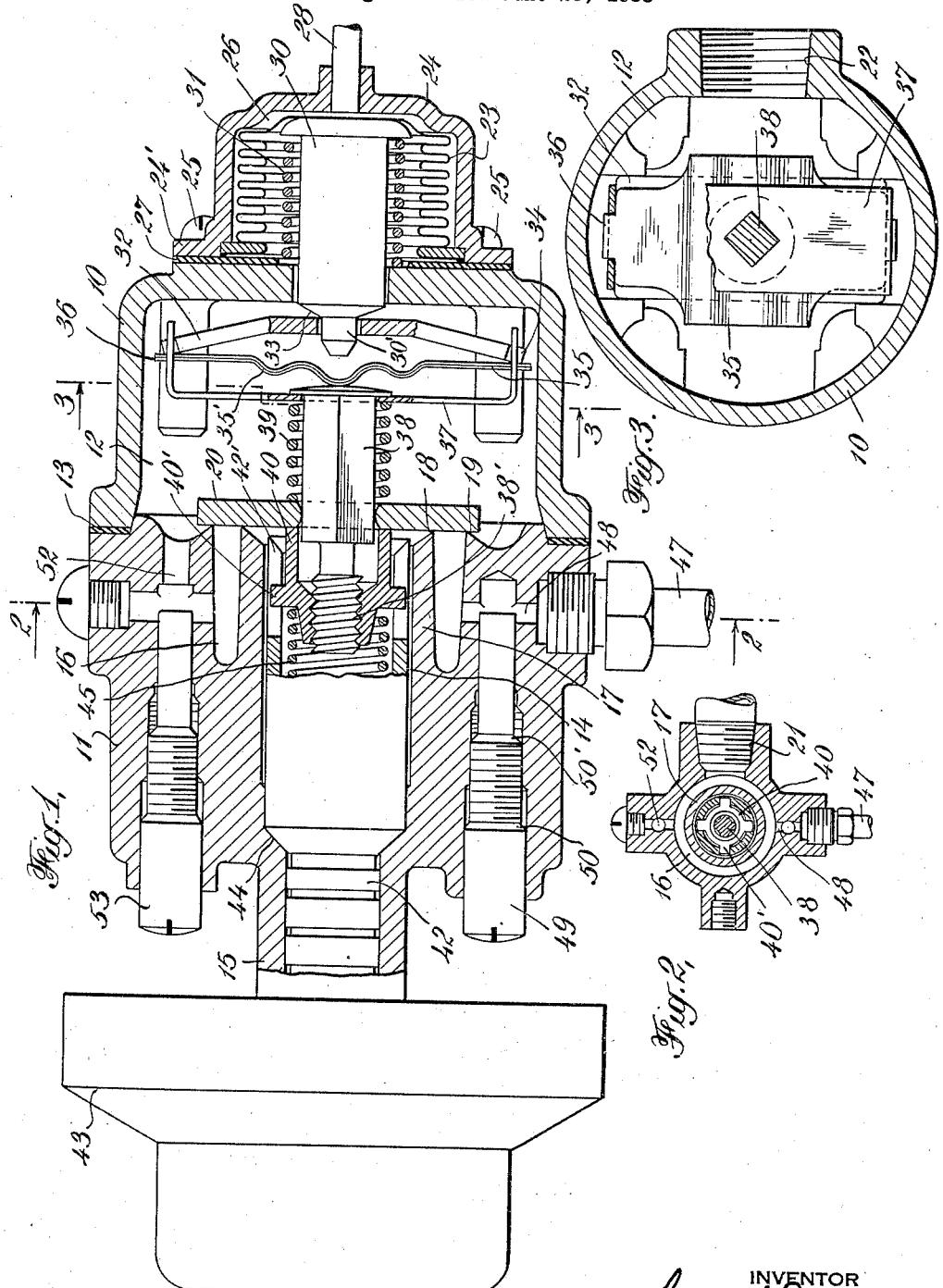
INVENTOR
Benson F. Waddell
BY
Pennie Davis Marvin & Edmonds
ATTORNEYS Patented Apr. 8, 1941

2,237,399

UNITED STATES PATENT OFFICE 2,237,399

REGULATOR

Benson F. Waddell, Newark, N. J., assignor to The Wilcolator Company, Newark, N. J., a corporation of Delaware Original application June 23, 1938, Serial No. 215,347. Divided and this application June 30, 1939, Serial No. 282,152

8 Claims. (Cl. 236—99)

This invention relates to regulators for controlling the temperature in ovens, refrigerators, etc., and has particular reference to a novel temperature regulator including a valve operable by thermo-responsive means through a connection so constructed that the parts of the connection and the movable element of the valve may be easily removed from the regulator as a unit to permit cleaning or repairing of the regulator.

For illustrative purposes, the invention will be described and illustrated as a temperature regulator for gas ovens, although it will be understood that the principles of the invention are applicable to other types of regulators as well.

Regulators for gas ovens generally include a housing containing a valve for controlling the supply of fuel to the oven burner, and an element in the housing responsive to temperature changes in the oven for moving the valve member relative to its seat. In such regulators, as commonly made heretofore, the thermo-responsive element actuates the valve member through a connection including a considerable number of parts, such as a compensating means for counteracting ambient temperature changes and adjustment means by which the regulator may be adjusted to different temperature settings. These parts of the connection are generally installed in the housing individually, and, as a result, it is difficult to assemble the regulator and to take it apart for cleaning purposes. Also, the valve member and the parts of the connection cannot be readily removed from the regulator without disturbing some of the other parts.

One feature of the present invention resides in the provision of a novel temperature regulator which overcomes these objections to prior regulators and in which the entire valve mechanism, including the valve member and its connection to the thermo-responsive element, may be readily removed as a unit without disarranging the other parts of the regulator.

A regulator made in accordance with my invention comprises a valve disposed in a housing, and a thermo-responsive element in the housing on one side of the valve for actuating the movable member thereof. The thermo-responsive element is connected to the valve member through a valve sub-assembly comprising a bracket, or the like, held against a shoulder of the thermo-responsive element and removable therefrom. Secured to the arms of the bracket by a suitable retaining member is a rod or valve stem, one end of which preferably engages a bimetallic compensator likewise secured to the bracket by the retaining member, the stem being movable endwise relative to the bracket in response to flexing of the bimetal so as to compensate for ambient temperature changes. Preferably, the stem projects through an opening in the valve member in which it is slidable, and threaded on the projecting end of the stem is an adjustment nut against which the valve member is urged by a spring coiled around the stem between the retainer and the valve member.

This valve sub-assembly, including the valve member, the stem with the adjustment nut and spring, and the compensator and bracket, is normally urged against the shoulder of the thermo-responsive element by another spring in the housing, so that each movement of the thermo-responsive element results in a corresponding movement of the valve stem. However, the sub-assembly is removable as a unit from the housing when the latter is taken apart and may be installed in the housing as a unit without disturbing the setting of the adjustment nut or disarranging the other parts. The valve member may be adjusted on the stem to different temperature settings by turning the adjustment nut, preferably by means of a shaft having a sliding connection with the nut and carrying a temperature adjustment handle. With this construction, when the valve member is seated, movement of the thermo-responsive element due to "over-shoot" is accommodated by a sliding movement of the stem through the valve member so as to disengage the adjustment nut therefrom and compress the spring on the stem, the spring holding the valve member firmly seated until movement of the thermo-responsive element in the opposite direction causes the nut to reengage the valve member.

For a better understanding of the invention reference may be had to the accompanying drawing, in which Fig. 1 is a longitudinal sectional view of one form of the new regulator, and Figs. 2 and 3 are reduced sectional views on the lines 2—2 and 3—3 in Fig. 1.

The new regulator, as shown, comprises a valve housing including a hollow, rear section 10 removably secured to a front section 11 to form a main chamber 12. Preferably, packing 13 is interposed between the housing sections to make the chamber gas-tight. The flow of gas through the chamber 12 is controlled by a valve of any suitable form but which is preferably a valve having a double seat construction as disclosed in my copending application Serial No. 215,347, filed June 23, 1938, of which this application is a division. More particularly, the front section 11 is formed with a passage 14 extending forwardly from the chamber 12 through a hollow boss 15 at the front end of the housing, and adjacent the passage 14 is a gas passage 16 which leads into the main chamber. The passage 16, as illustrated, is annular and is disposed in the front section 11 concentric with the passage 14 so that the two passages are separated by an annular wall 17. At its end, the wall 17 is provided with a sharp annular rim 18 which coacts with a similar concentric rim 19 to form a double seat at the mouth of the passage 16 for a valve member 20. The housing is provided with an inlet 21 for admitting gas to the annular passage 16, and the valve member 20 and the seat 18—19 together form a control means for regulating the flow of gas from passage 16 through the chamber 12 to an outlet port 22 in the housing, which may be connected to an oven burner (not shown).

The valve member 20 is movable by thermo-responsive means which may take various forms but preferably comprises a bellows 23 sealed within a cup 24 connected to the rear end of the housing by bolts 25, the bellows and cup together forming an expansible and contractible chamber 26. The open end of the cup 24 is sealed to the housing by an annulus 27 interposed between the rear end of the housing and a flange 24' on the cup. At its rear end, the cup 24 has an opening in which one end of a capillary tube 28 is sealed, the tube leading from the chamber 26 to a bulb (not shown) adapted to be located in the oven. The bulb, tube and chamber 26 are filled with a thermo-responsive liquid, such as chlorinated diphenol. A headed pin 30 is seated against the end of the bellows and extends forwardly into chamber 12 through the annulus 27 and a central opening in the rear end of the housing, the front end of the pin being reduced, as shown at 30'. A spring 31 coiled around pin 30 bears at one end against the rear end of the housing and at the opposite end against the head of the pin and tends to expand the bellows and compress the liquid in chamber 26.

The pin 30 responds to temperature changes in the oven through expansion and contraction of the chamber 26 due to heating and cooling of the liquid in the bulb, and the movements of the pin are utilized to control the passage of the gas through the seat 18—19 by means of the valve sub-assembly of the invention. The sub-assembly, as shown, comprises a bracket 32 disposed in chamber 12 and formed with a central opening through which the reduced end 30' of pin 30 extends, the bracket being normally seated against a shoulder 33 on the pin adjacent the reduced end thereof. The arms of the bracket are inclined forwardly relative to the central portion thereof and are reduced in width at their extremities to form lugs 34. A strip of bimetal 35 is seated in front of the bracket against the ends of the bracket arms, the bimetal being preferably formed with transverse corrugations 35'. At its ends, the bimetallic strip is provided with lugs 36 similar to the lugs 34, and the lugs 34 and 36 extend through openings in the legs of a U-shaped retainer 37 made of spring metal. The intermediate portion of the retainer has an opening through which a square, headed rod or stem 38 extends, the head of the stem engaging the rear face of retainer 37 and normally bearing against the central corrugation of the strip 35. The retainer thus holds the stem and the bimetallic strip in operative relation on the bracket.

The stem 38 extends forwardly through a square opening in valve member 20 and is formed at its front end with a reduced, threaded portion 38'. The stem fits loosely in the opening in the valve member, and the edges of the opening are rounded so that the valve member may adjust itself on the stem to seat properly on the valve seat 18—19. Coiled around the stem is a spring 39 which bears at one end against the retainer 37 and at the opposite end against the valve member 20. An adjustment nut 40 threaded on the reduced end of the stem normally engages the front face of valve member 20 and may be screwed on the stem to adjust the valve member.

The nut 40 is adjustable on stem 38 by adjustment means which preferably comprises a hollow shaft 42 extending through the passage 14 and the hollow boss 15 and rotatable by a temperature adjustment dial 43 in front of the housing. A shoulder 44 on the shaft normally engages a coacting shoulder in the passage 14, thereby determining the axial position of the shaft in the housing. At its inner end, the shaft 42 is formed with longitudinal slots 42' into which a plurality of radial lugs 40' on the adjustment nut extend. A coil spring 45 in the shaft is seated at one end against the internal face of shoulder 44 and at its opposite end against the nut and serves the dual function of urging the bracket 32 against the shoulder of the thermo-responsive pin 30 and taking up any looseness of the nut on the stem 38.

When the oven is not in use, the dial 45 is in its "off" position wherein the nut 40 is disposed near the outer end of the stem 38 and the spring 39 urges the valve member against its seat. In starting the oven, the dial is turned so as to rotate the shaft and screw the nut 40 to the right, as seen in Fig. 1. The nut thus forces the valve member away from its seat along the valve stem 38 against the action of spring 39, the distance through which the valve member is moved being determined by the desired temperature setting of the dial. As the oven commences to heat, the expansion of the liquid in the bulb causes the bellows to collapse, and as a result, the pin 30 acts through the bracket 32, the bimetallic strip 35, and the stem 38 to move the nut 40 to the left. The valve member, therefore, is moved by the spring 39 toward its seat and throttles the flow of gas from the inlet 20 to the oven burner. When the temperature of the oven corresponds to the temperature for which the dial is set, the valve member is held in a throttling position in which it allows just enough gas to pass to the burner to maintain the oven at the desired temperature. Thereafter, any cooling of the oven causes the bellows to expand, whereby the spring 45 moves stem 38 and the valve member to the right to admit a greater amount of gas to the burner.

If the oven temperature should rise above the temperature for which the dial is set, due to "over-shoot," the valve member is first moved by contraction of the bellows against the seat 18—19 so as to cut off the flow of gas to the burner, and then continued contraction of the belllows causes the stem 38 to move to the left through the valve member so as to disengage the nut from the valve member and compress the springs 39 and 45. When the oven cools, expansion of the bellows allows spring 45 to move the stem to the right and reengage the nut with the valve member, after which further expansion of the bellows causes the stem and the nut to move the valve member away from the seat. It will be apparent that in adjusting the regulator from a high temperature setting to a lower one, the dial is turned so as to screw the nut 40 outwardly to the left on the stem, whereby the spring 39 moves the valve member along the stem toward the seat.

In some installations, the regulator may be mounted on the range near an open burner which might heat and expand the liquid in chamber 26. Such expansion of the valve, unless suitable provision were made to counteract the action of the external heat. In the new regulator, when the liquid in chamber 26 expands due to external heat, thereby urging pin 30 to the left, the bimetallic strip 35 bows so that the intermediate portion thereof moves to the right. Since the spring 45 and the retainer 37 urge the head of stem 38 against strip 35, the stem follows the intermediate portion of the strip to the right and compensates for the liquid expansion in chamber 26. When the external heat source permits the liquid in chamber 26 to cool, causing pin 30 to move to the right, the compensating strip 35 bows in the opposite direction so as to force the head of stem 38 to the left an equal amount. The corrugations 35' prevent bowing of the compensator in a direction transverse to its length but do not affect longitudinal bowing thereof, and accordingly longitudinal bowing of the compensator is unretarded by the transverse flexing common to bimetallic strips. The compensator, therefore, may be made relatively small and will still perform the same amount of work as larger compensators of this type as made heretofore.

If desired, the oven may be provided with a pilot (not shown) supplied with gas by a pipe 47 threaded in one side of the housing and communicating through a transverse passage 48 with gas passage 16. The supply of gas from passage 16 to the pilot may be adjusted by a screw 49 extending transversely through the passage 48, that is, lengthwise of the housing. The screw 49 is provided with shoulders 50 and 50' at opposite ends of the threaded portion thereof, and these shoulders coact with shoulders in the casing to form grease or packing chambers acting as a double seal. A bypass 52 may be provided in the casing between the annular passage 16 and the main chamber 12, and the flow of gas through the bypass may be regulated by an adjustment screw 53 similar to screw 49.

In the new regulator, the valve sub-assembly including the bracket 32, the compensator 35 and its retainer 37, the valve stem 38, the valve member 20, and the spring 39 and adjustment nut 40 on the stem, may be removed as a unit by detaching the hollow section 10 from the front section 11 of the housing. In detaching the section 10, the reduced end of the thermo-responsive pin 30 is withdrawn from the opening in bracket 32, and thereupon the spring 45 in the adjustment shaft forces the sub-assembly from the slots in the inner end of the shaft. In this way, access to the passage 16 and the valve seat 18—19 may be readily obtained to permit cleaning of the valve. The sub-assembly may be replaced by inserting the lugs 40' on the adjustment nut in the slots 42' of the shaft against the spring 45 and then inserting the reduced end of pin 33 into the bracket opening and securing the housing sections together. In removing and installing the valve subassembly, the adjustment shaft 42 and dial 43 need not be disturbed and the setting of the adjustment nut on the stem need not be changed, so that the nut will be replaced in its original position with respect to the shaft to maintain proper calibration. The spring 45 takes up any slack in the sub-assembly and holds the bracket 32 firmly against shoulder of pin 30, so that the movements of the valve stem 38 correspond accurately with the movements of the pin and the bellows. It will be apparent that the unitary sub-assembly described performs the several functions of controlling the passage of gas through the valve seat, providing for adjustment of the valve to different temperature settings, accommodating "overshoot", and compensating for ambient temperature changes.

I claim:

1. In a fluid regulator comprising a valve seat, a valve member coacting therewith, and a thermo-responsive element for actuating the valve member, the combination of a bracket engaging said element and removable therefrom, a bimetallic compensator held at its ends on the bracket and operable to flex intermediate its ends in response to ambient temperature changes, a stem engaged at one end with the intermediate portion of the compensator and operatively connected to the valve member, and a flexible retainer for securing the compensator and the stem in position on the bracket, the compensator being operable to flex the retainer and adjust the position of the stem relative to the bracket.

2. In a fluid regulator comprising a valve seat, a valve member coacting therewith, and a thermo-responsive element for actuating the valve member, the combination of a bracket engaging said element and removable therefrom, a bimetallic compensator seated near its ends against the end portions of the bracket and operable to flex intermediate its ends in response to ambient temperature changes, a generally U-shaped, flexible retainer having openings in the arms thereof into which adjacent ends of the compensator and bracket extend, the retainer holding the compensator in position on the bracket, and a stem operatively connected to the valve member and held by the body of the retainer in operative engagement with the intermediate portion of the compensator, the compensator being operable to flex the retainer and adjust the position of the stem relative to the bracket.

3. In a fluid regulator comprising a valve seat, a valve member coacting therewith, and a thermo-responsive element for actuating the valve member, the combination of a bracket engaging said element and removable therefrom, a bimetallic compensator seated near its ends against the end portions of the bracket and operable to flex intermediate its ends in response to ambient temperature changes, a generally U-shaped, flexible retainer having openings in the arms thereof into which adjacent ends of the compensator and bracket extend, the retainer holding the compensator in position on the bracket, a stem operatively connected to the valve member and held by the body of the retainer in operative engagement with the intermediate portion of the compensator, and a spring normally urging the stem against the compensator, the compensator being operable to flex the retainer and adjust the position of the stem relative to the bracket.

4. In a fluid regulator comprising a housing having inlet and outlet ports, a valve seat between the ports, and a thermo-responsive element in the housing, a valve subassembly for controlling flow through the valve seat and comprising a bracket engaging said element and removable therefrom, a bimetallic compensator seated near its ends against the end portions of the bracket and operable to flex intermediate its ends in response to ambient temperature changes, a pair of threaded members engaged at one end with the intermediate portion of the compensator, a flexible retainer for securing the compensator and the threaded members to the bracket, the compensator being operable to flex the retainer and adjust the position of the threaded members relative to the bracket, a valve member slidable on one of said threaded members and coacting with the seat, one of said threaded members having an abutment on the same side of the valve member as the seat and engageable with the valve member under control of said element to unseat the valve member, said last threaded member being adjustable relative to the other to move the valve member away from its seat, and a spring urging the valve member toward the abutment, said sub-assembly being removable from the thermo-responsive element as a unit.

5. In a fluid regulator comprising a housing having inlet and outlet ports, a valve seat between the ports, and a thermo-responsive element in the housing, a valve sub-assembly for controlling flow through the valve seat and comprising a bracket engaging said element and removable therefrom, a bimetallic compensator seated near its ends against the end portions of the bracket and operable to flex intermediate its ends in response to ambient temperature changes, a pair of threaded members engaged at one end with the intermediate portion of the compensator, a flexible retainer for securing the compensator and the threaded members to the bracket, the compensator being operable to flex the retainer and adjust the position of the threaded members relative to the bracket, a valve member slidable on one of said threaded members and coacting with the seat, one of said threaded members having an abutment on the same side of the valve member as the seat and engageable with the valve member under control of said element to unseat the valve member, said last threaded member being adjustable relative to the other to move the valve member away from its seat, and a spring urging the valve member toward the abutment, said sub-assembly being removable from the thermo-responsive element as a unit, and a temperature adjustment shaft having a sliding connection with said last threaded member and rotatable to adjust said last threaded member relative to said element.

6. In a fluid regulator comprising a housing having inlet and outlet ports, a valve seat between the ports, and a thermo-responsive element in the housing, a valve sub-assembly for controlling flow through the valve seat and comprising a bracket engaging said element and removable therefrom, a bimetallic compensator seated near its ends against the end portions of the bracket and operable to flex intermediate its ends in response to ambient temperature changes, a pair of threaded members engaged at one end with the intermediate portion of the compensator, a flexible retainer for securing the compensator and the threaded members to the bracket, the compensator being operable to flex the retainer and adjust the position of said threaded members relative to the bracket, a valve member slidable on one of said threaded members and coacting with the seat, one of said threaded members having an abutment on the same side of the valve member as the seat and engageable with the valve member under control of said element to unseat the valve member, said last threaded member being adjustable relative to the other to move the valve member away from its seat, and a spring urging the valve member toward the abutment, said sub-assembly being removable from the thermo-responsive element as a unit, a hollow shaft having a sliding connection with said last threaded member and rotatable to adjust said last threaded member relative to said element, and a compression spring seated in the shaft and urging the sub-assembly against the thermo-responsive element.

7. In a fluid regulator comprising a valve seat, a valve member coacting with the seat, and a thermo-responsive element for actuating the valve member, the combination of a bracket, a pin on one of said brackets and element engaged in an opening in the other to secure the bracket against lateral displacement on the element, said pin and opening forming a sliding connection between the bracket and said element permitting removal of the bracket from the element, a bimetallic compensator engaged at its ends with the bracket and spaced from the bracket intermediate its ends, a stem operatively connected to the valve member, and a flexible retainer connected to the bracket for securing the compensator to the bracket and holding the end of the stem against the intermediate part of the compensator, the compensator being operable to flex the retainer and adjust the portion of the stem relative to the thermo-responsive element.

8. In a fluid regulator comprising a valve seat, a valve member coacting with the seat, and a thermo-responsive element for actuating the valve member, the combination of a bracket having a sliding connection with a thermo-responsive element whereby the bracket is removable from said element, a bimetallic compensator engaged at its ends with the bracket and spaced from the bracket intermediate its ends, a stem extending loosely through the valve member and operatively connected thereto, a retainer for securing the compensator to the bracket and holding one end of the stem against the intermediate part of the compensator, and a spring coiled around the stem and engaged at one end with the valve member and at the opposite end with the retainer for biasing the valve member along the stem.

BENSON F. WADDELL.